United States Patent [19]

Keilmann et al.

[11] Patent Number: 4,561,721

[45] Date of Patent: Dec. 31, 1985

[54] ATTENUATOR FOR OPTICAL RADIATION

[75] Inventors: Fritz Keilmann, Stuttgart; Karl-Wilhelm Kussmaul, Ostelsheim, both of Fed. Rep. of Germany

[73] Assignee: Max-Planck-Gesellschaft zur Foerderung de Wissenschafen E.V., Gottingen, Fed. Rep. of Germany

[21] Appl. No.: 564,097

[22] Filed: Dec. 21, 1983

[30] Foreign Application Priority Data

Dec. 23, 1982 [DE] Fed. Rep. of Germany ....... 3247794

[51] Int. Cl.⁴ ................................................ G02B 5/18
[52] U.S. Cl. ........................... 350/162.17; 350/162.23; 350/1.7; 219/121 LA; 372/102
[58] Field of Search ....................... 350/162.15, 162.17, 350/1.1, 162.23, 162.24, 1.6, 1.7, 162.19, 162.2, 162.11, 162.12, 162.13, 162.14, 276 R, 276 SL, 276 A; 250/237 G; 356/374; 372/102; 219/121 L, 121 LA

[56] References Cited

U.S. PATENT DOCUMENTS 3,620,599  11/1971  Ashkin ........................... 350/162.11
4,327,966   5/1982  Bloom ............................ 350/162.24

Primary Examiner—John K. Corbin
Assistant Examiner—Bruce S. Shapiro
Attorney, Agent, or Firm—Brumbaugh, Graves, Donohue & Raymond

[57] ABSTRACT

In the representative embodiments described herein, an attenuator of optical radiation, and specifically high-intensity laser radiation, comprises a plurality of diffracting sheet members, containing a plurality of apertures, disposed at an angle to the incident radiation. The sheet members may be wire screens and the attenuator may include a plurality of such screens disposed at different angles and having different mesh orientations.

8 Claims, 3 Drawing Figures

ATTENUATOR FOR OPTICAL RADIATION

BACKGROUND OF THE INVENTION

This invention relates to attenuators for optical radiation and, more particularly, to a new and improved attenuator especially adapted to attenuate laser radiation.

Laser radiation has been employed increasingly in science and technology, particularly since lasers with high radiation output capacity, such as the $CO_2$ laser, have become available. In many cases it is necessary to adjust the intensity of laser radiation emitted by such a high intensity source in accordance with the intended use.

Inasmuch as control of the output of a laser presents certain problems, external radiation absorbers have heretofore been used to adjust radiation intensity. For example, quartz or glass plates are provided with an absorbing coloring or coating which is as nearly neutral as possible. Such grey filter plates, however, are not neutral over a broad wavelength band. That is, the absorption depends upon the wavelength of the radiation transmitted. Moreover, such filter plates introduce disturbances due to interference of rays reflected from the front and the back surfaces as well as wave front distortion resulting from irregularities in the front and back surfaces and the spacing between them, especially when the absorber plate becomes hot.

BRIEF SUMMARY OF THE INVENTION

Therefore, it is an object of the present invention to provide an attenuator for optical radiation, in particular high-intensity laser radiation, which overcomes the above-mentioned disadvantage of the prior art and which is substantially independent of its temperature and of the wavelength of the radiation.

In accordance with the invention a radiation attenuator is provided by disposing a multi-apertured sheet member at an angle to the direction of propagation of the radiation. Preferably, the sheet member has a diffraction structure with a reflecting surface facing the incident radiation and is disposed at an angle of slightly less than 90° to the incident radiation to prevent reflected or refracted radiation from being returned to the radiation source. In a particular embodiment the sheet member is a metal grating mounted in a radiation-absorbing housing provided with cooling and at least two sheet members are mounted in the housing with adjacent members disposed at different angles to the incident radiation. In addition, the orientation of the grating structure with respect to the incident radiation is different for successive screen members.

The attenuator of the invention is therefore capable of attenuating high intensity radiation and is independent of temperature and of the wavelength of the radiation over a broad wavelength range.

BRIEF DESCRIPTION OF THE DRAWINGS

The invention is described in greater detail hereinafter with reference to the accompanying drawings, in which.

DETAILED DESCRIPTION OF PREFERRED EMBODIMENTS

The attenuator of the present invention is based upon the principle of wave optics by which a multi-apertured sheet member, such as a phase diffraction grating, diffracts incident radiation having a wavelength comparable to the aperture grating spacing without loss of energy. For example, a wire mesh or grating of suitable wire spacing will diffract incident radiant energy in the same manner as two crossed ruled diffraction gratings. Thus, the attenuator of the invention comprises at least one multi-apertured diffracting sheet structure, preferably a grating composed of two arrays of preferably uniformly spaced wires disposed preferably at right angles. The sheet member is preferably made of metal to provide suffient thermal capacity and, for high intensity radiation, the multi-apertured sheet member is preferably made, for example, of metals having good heat conductivity, such as gold, silver or copper or metals with a high melting point, such as tungsten. The sheet member may be in the form of a wire cloth or a grating obtained by welding or soldering the crossing points or may be produced lithographically or electrolytically. Preferably, the sheet member is self-supporting in order to avoid multiple reflections from the front and back surfaces of a supporting member.

The aperture structure of the sheet member is, in general, substantially regular, for example, a linear structure, as provided by a ruled grating, a lattice structure, as provided by a lattice grating, a hexagonal structure, or the like. The apertures may be square, round, hexagonal, striped or shaped in some other regular manner.

The thickness of the sheet member should be smaller than or, at most, approximately equal to, the wavelength of the optical radiation for which it is to be used. For all practical purposes, the ratio of the period of the structure of the sheet member to the wavelength of of the radiation should be between approximately 0.1 and 100 and is preferably from approximately 1 to 10, most preferably about 3.

Figure 1:
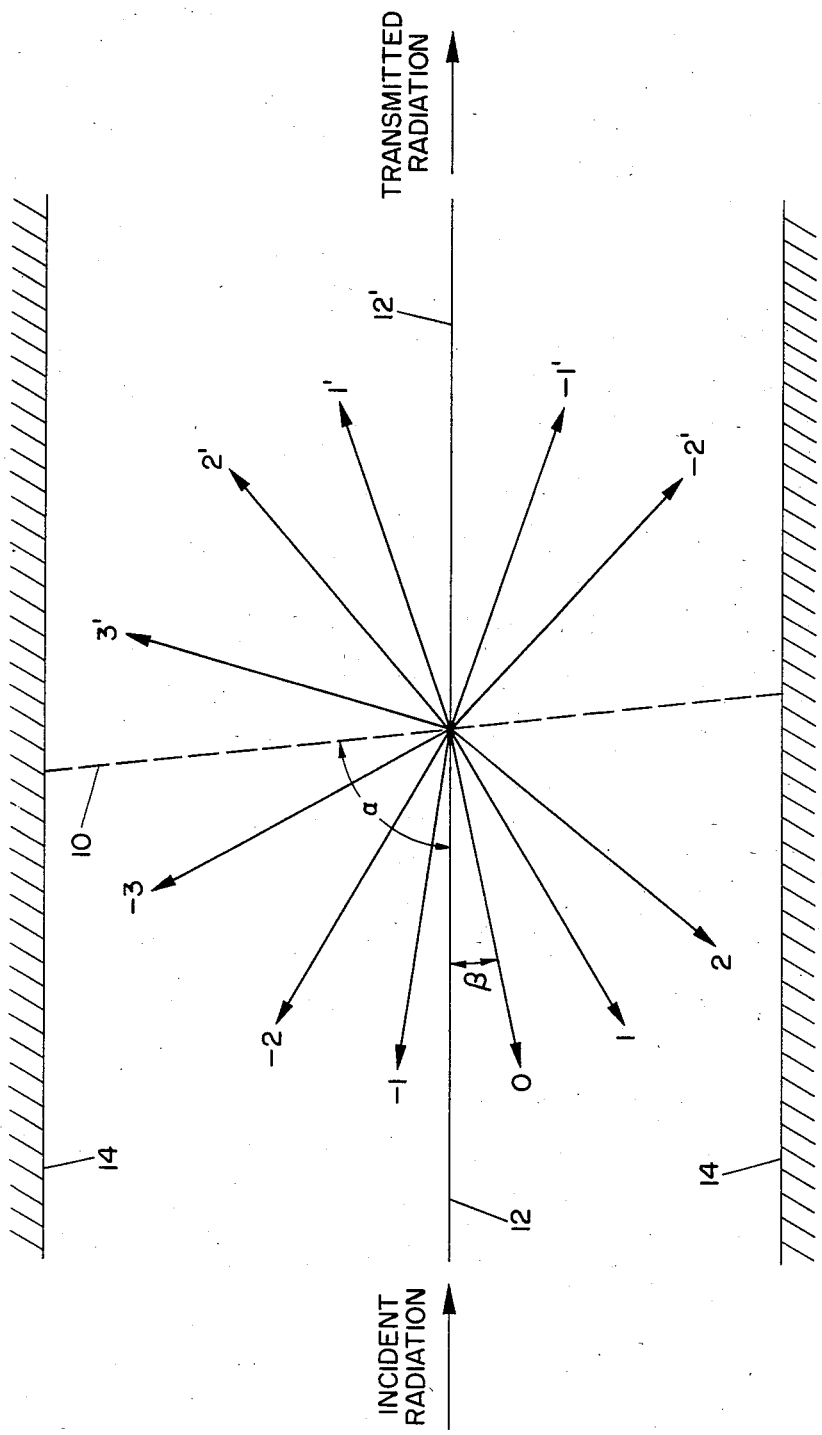
FIG. 1 is a schematic diagram illustrating the manner of operation of the attenuator of the invention.

As shown in FIG. 1, a multi-apertured sheet member 10, such as a wire mesh or grating, disposed in the path 12 of incident radiation, has a diffracting structure with a period such as to provide several orders of diffraction on each side of the radiation axis. Preferably, the sheet member is arranged to provide three or more orders of diffraction. In addition, the surface of the sheet member 10 facing the incident radiation is made reflective to contribute to the attenuating effect of the screen 10. Preferably, the screen is designed so that the surface facing the incident radiation reflects as much radiation as possible, for example, more than 60%.

The invention is described hereinafter with reference to a sheet member in form of a wire mesh since that is, at the present time, the preferred embodiment. The description of the invention and its operation also apply, however, to other types of sheet members provided with a plurality of apertures and consisting of radiation-opaque, preferably reflecting, materials.

As shown in FIG. 1 the screen 10 is a wire mesh disposed at an angle to the direction of incident radiation so that neither reflected nor diffracted rays can return to the radiation source, which may, for example, be a laser with high intensity output. For this purpose the wire mesh 10 is positioned at an angle α with respect to the optical axis 12 of the incident radiation which is slightly less than 90 degrees, so that the reflected, zero order, radiation and the diffracted radiation orders of 1, −1; 2, −2, etc., form an angle with the axis 12 of the incident radiation path which is substantially greater than zero. In particular, the angle β of the reflected radiation may be approximately half the diffraction angle of the first order diffracted radiation.

The attenuator of the invention preferably includes lateral walls 14 which have a highly absorptive surface so as to absorb the reflected radiation as well as the diffracted radiation of all orders of diffraction, both forward and backward from the screen 10, i.e. 1, 1', −1, −1', 2, 2', −2, −2', etc.

Thus, attenuation of the incident radiation is obtained by reflecting and refracting portions of the incident radiation without affecting the remainder of the radiation. The transmitted beam 12' therefore does not undergo any changes such as those which could result in misalignment of its wave front. Moreover, it does not undergo any modification of its state of polarization.

One example of an embodiment of the invention is a rectangular screen made of 6 μm thick copper wires, forming square meshes with a period of 24 μm, providing a fixed attenuation factor between approximately 2 and 3 which was constant for wavelengths in the range of 9 to 11 μm as well as for radiation intensities in the kilowatt per square centimeter range.

Figure 2:
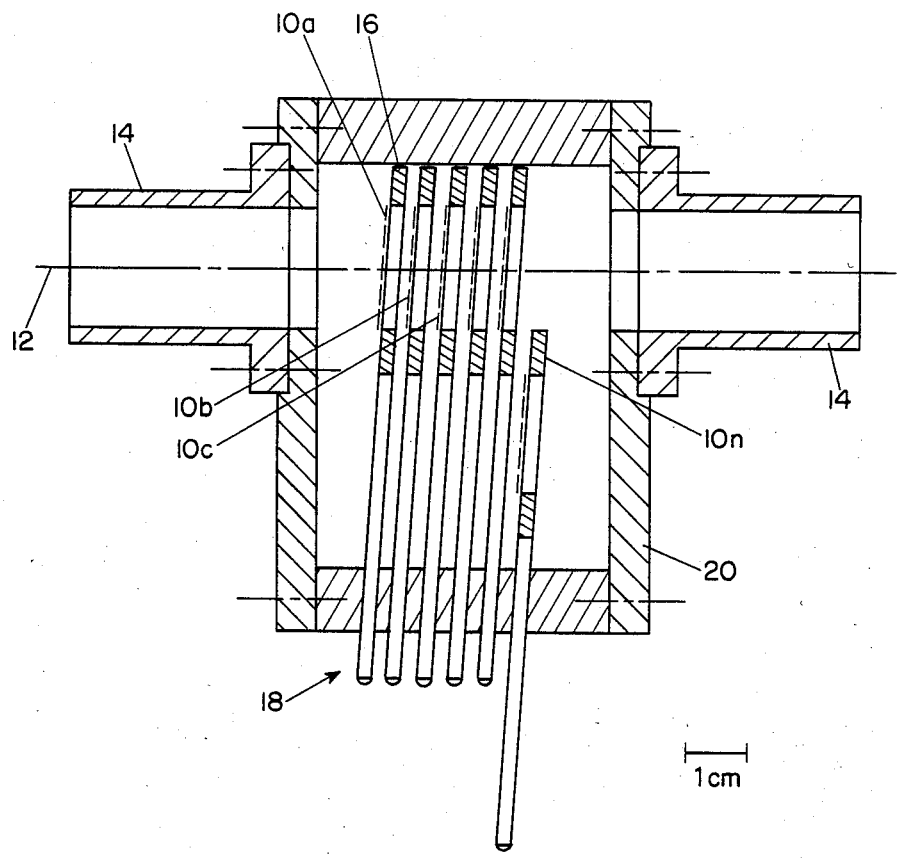
FIG. 2 is an axial sectional view illustrating, in simplified form, a representative embodiment of the invention.

In order to obtain even greater attenuation, several multi-apertured sheet members, such as the wire screens 10a, 10b, 10c, etc. may be disposed one behind the other in the path of the incident radiation, as shown in FIG. 2. Each of the metal screens is arranged in an annular holder 16 which has a high thermal capacity and/or a high thermal conductivity. Preferably, the screens are cooled by circulating a gas, such as hydrogen, helium or air, through a housing 20 containing the screen arrangement and having inner walls which absorb the diffracted and reflected radiation. For step-wise modification of the attenuation factor of an absorber of the kind shown in FIG. 2, the individual wire screens 10a, 10b, 10c are fastened on support bars 18 so that they can be withdrawn as desired from the path of the incident radiation in the manner illustrated in FIG. 2 for the wire screen 10n.

Figure 3:
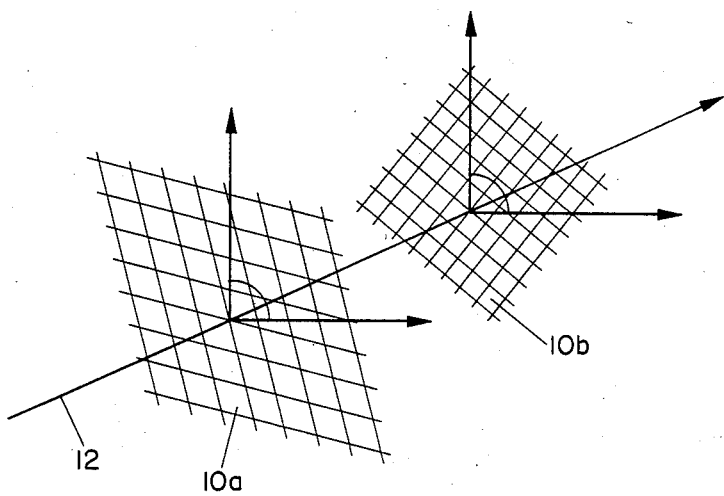
FIG. 3 is a schematic representation in perspective showing the orientation of two adjacent metal gratings of an absorber in accordance with a further aspect of the invention.

If several metal screens are positioned in succession in the path of the incident radiation, as shown in FIG. 2, adjacent screens are preferably not arranged parallel to one another. Instead, they are positioned with their planes at an angle which is different from 0 (e.g., of 5 to 20 degrees). This prevents multiply-reflected radiation, of zero order, from being transmitted in the direction parallel to the axis of the incident radiation 12. In addition, the wire arrays of adjacent metal screens are preferably not parallel to one another. Instead, they are rotated relative to one another around the axis of the incident radiation, for example, by 30 degrees. In this way, doubly-diffracted bundles of rays are prevented from being transmitted in the direction parallel to the axis of the incident radiation. This is illustrated schematically in FIG. 3 wherein the screen 10b is rotated approximately 45° with respect to the screen 10a. For this purpose, the wire screens 10a, 10b, 10c, etc. are preferably mounted in turret plates on the bars 18 to permit a rapid, reproducible, step-wise adjustment.

A continuously adjustable degree of attenuation, e.g., up to 25 or 30%, may be provided by rotation of a metal screen around an axis which is perpendicular to the incident radiation axis, for example, within a range of from 10° to 40° relative to the direction of the incident radiation. By such rotation, however, the polarization state of the incident radiation is slightly modified. If such modification of the polarization state is to be avoided, continuously adjustable attenuation may be effected by rotation of two adjacent screens through equal angles around corresponding axes which are perpendicular to each other and to the axis of the beam path. In this way, the effects of the rotation of the individual screens on the polarization state of the incident radiation are compensated.

Thus, with the attenuator of the present invention, the intensity of incident radiation is reduced by separating a portion of the incident radiation from the remainder by diffraction or reflection or both and dissipating the separated radiation outside the path of the incident radiation.

We claim:

1. An attenuator for a beam of optical radiation of a given wavelength propagating along a predetermined direction comprising a plurality of planar, multi-apertured sheet members positioned in spaced relationship along said direction to extend across said beam, each of the sheet members having a plurality of spaced-apart apertures forming a periodic pattern in two directions having a period in the range of one to ten times said given wavelength of the optical radiation, each of said sheet members forming a respective angle with said predetermined direction, the angles formed by said sheet members being mutually different and different from 90°.

2. An attenuator according to claim 1 further comprising means for mounting each of said sheet members for selectively positioning respective ones of said sheet members into and out of said beam.

3. An attenuator according to claim 1, wherein each of said sheet members is made of an appropriate metal and has a highly reflecting surface.

4. An attenuator according to claim 1, wherein each of said sheet members has a thickness along said predetermined direction that is of the same order as said given wavelength.

5. An attenuator according to claim 1, wherein said pattern of said apertures in each of said sheet members is substantially periodic in a first and a second direction, the first and second directions of each of said sheet members having mutually different orientations.

6. An attentuator according to claim 1, wherein each of said sheet members comprises a wire mesh.

7. An attenuator according to claim 1, wherein each of said sheet members comprises a diffracting structure formed with a material of low absorption of optical radiation of said given wavelength.

8. An attentuator according to claim 7, wherein the angle between each of said members and said predetermined direction of the beam is such that optical radiation reflected from each said sheet member and optical radiation diffracted of first order from each said the sheet member form first and second angles with said predetermined direction, respectively, the first angle being approximately one-half of the second ngle.

* * * * *